United States Patent
Ogata et al.

(10) Patent No.: US 10,501,647 B2
(45) Date of Patent: *Dec. 10, 2019

(54) INK COMPOSITION FOR HIGH-SPEED SCREEN PRINTING, PRINTED ARTICLE OBTAINED BY HIGH-SPEED PRINTING OF SAID INK COMPOSITION, AND METHOD FOR PRODUCING SAID PRINTED ARTICLE

(71) Applicant: Teikoku Printing Inks Mfg. Co., Ltd., Tokyo (JP)

(72) Inventors: Tomomi Ogata, Tokyo (JP); Takuya Torihata, Tokyo (JP); Naoto Takada, Tokyo (JP)

(73) Assignee: TEIKOKU PRINTING INKS MFG. CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/302,131

(22) PCT Filed: Dec. 2, 2015

(86) PCT No.: PCT/JP2015/083888
§ 371 (c)(1),
(2) Date: Oct. 5, 2016

(87) PCT Pub. No.: WO2016/121220
PCT Pub. Date: Aug. 4, 2016

(65) Prior Publication Data
US 2018/0010002 A1    Jan. 11, 2018

(30) Foreign Application Priority Data
Jan. 27, 2015 (JP) .................................. 2015-013207

(51) Int. Cl.
| | |
|---|---|
| *C09D 11/033* | (2014.01) |
| *C09D 11/03* | (2014.01) |
| *C09D 11/10* | (2014.01) |
| *C09D 11/037* | (2014.01) |
| *C09D 11/102* | (2014.01) |
| *C09D 11/104* | (2014.01) |
| *C09D 11/106* | (2014.01) |
| *C09D 11/107* | (2014.01) |
| *C09D 11/52* | (2014.01) |
| *B41M 1/12* | (2006.01) |
| *B41M 1/26* | (2006.01) |
| *B41M 1/30* | (2006.01) |
| *B41M 1/34* | (2006.01) |
| *B41F 15/00* | (2006.01) |

(52) U.S. Cl.
CPC ............ *C09D 11/033* (2013.01); *B41F 15/00* (2013.01); *B41M 1/12* (2013.01); *B41M 1/26* (2013.01); *B41M 1/30* (2013.01); *B41M 1/34* (2013.01); *C09D 11/03* (2013.01); *C09D 11/037* (2013.01); *C09D 11/10* (2013.01); *C09D 11/102* (2013.01); *C09D 11/104* (2013.01); *C09D 11/106* (2013.01); *C09D 11/107* (2013.01); *C09D 11/52* (2013.01)

(58) Field of Classification Search
None
See application file for complete search history.

(56) References Cited

U.S. PATENT DOCUMENTS 9,879,145 B2 *   1/2018   Ogata ..................... B41M 1/12

FOREIGN PATENT DOCUMENTS

| JP | 2003-238876 A | | 8/2003 |
|---|---|---|---|
| JP | 2003-281936 A | | 10/2003 |
| JP | 2003-294930 A | | 10/2003 |
| JP | 2005-314632 A | | 11/2005 |
| JP | 2007-107057 A | | 4/2007 |
| JP | 2009-030065 A | | 2/2009 |
| JP | 2010-47649 A | | 3/2010 |
| JP | 2010-47716 A | | 3/2010 |
| JP | 2010047649 A | * | 3/2010 |
| JP | 2012-17411 A | | 1/2012 |

OTHER PUBLICATIONS

Oct. 5, 2018 Office Action issued in U.S. Appl. No. 15/302,289.
Feb. 26, 2019 Office Action issued in U.S. Appl. No. 15/302,289.

* cited by examiner

*Primary Examiner* — Joshua D Zimmerman
(74) *Attorney, Agent, or Firm* — Oliff PLC

(57) ABSTRACT

An ink composition for high-speed screen printing, includes a solvent with a boiling point of not less than 170° C. at not less than 70 wt % of the total solvent, and a prepolymer or polymer with a weight-average molecular weight of not less than 2000 at not less than 7 wt % with respect to the total ink composition, and having a viscosity of not less than 6 Pa·s and less than 30 Pa·s as measured with a BH-type rotating viscosimeter at 25° C., and a thixotropic index (TI value) of 2.0 to 8.0, the measured flow radius value of 14.0 to 24.0 mm after 1 minute from the start of measurement by a flow property measuring method using a spread meter at 25° C. according to JIS K5701-1:2000.

10 Claims, No Drawings

INK COMPOSITION FOR HIGH-SPEED SCREEN PRINTING, PRINTED ARTICLE OBTAINED BY HIGH-SPEED PRINTING OF SAID INK COMPOSITION, AND METHOD FOR PRODUCING SAID PRINTED ARTICLE

TECHNICAL FIELD

The present invention relates to an ink composition for high quality, high definition screen printing that allows high-precision printing of both fine patterns such as fine dot patterns or fine line patterns, and wide-area solid patterns, simultaneously in a single step by screen printing, even when using a cylinder press printer as a high-speed screen printer, or a semi-automatic screen printer with a squeegee speed of about 350 mm/sec, which are commonly used especially for creation of printed matter by screen printing in fields such as decorative graphics, as well as relates to printed matter obtained by the high-speed screen printing ink composition and relates to a method for producing the printed matter.

BACKGROUND ART

A cylinder press printer, as a high-speed screen printer (hereunder referred to as "cylinder press") is capable of high-speed printing and has high productivity, and such printers are widely used for high-speed mass production of various types of posters made by color separation printing, which is characterized by satisfactory durability and thick film printing capability, both advantages of screen printing, high-speed mass production of decorating panels and packages of game devices, household electrical appliances and the like, and high-speed mass production of dummy prints incorporated into automatic vending machines and the like.

On the other hand, at printing manufacturers that do not maintain cylinder presses due to the high cost of the equipment, it is a common strategy to use a semi-automatic screen printer for high-speed mass production, wherein screen printing is normally achieved with a squeegee speed (corresponding to the printing speed) of no greater than about 300 mm/sec, set at a squeegee speed of about not less than 350 mm/sec as the printing speed for high-speed printing.

Now, a cylinder press will be described as a typical example of a high-speed screen printer. Since a cylinder press is capable of high-speed mass production, attempts have been made recently to use cylinder presses for creation of screen printed matter, even for graphical decorative prints such as images on vehicle meters that have increased variation and higher definition of design, household electrical appliance labels having fine character images and the like, and frames or packages of tablet devices.

A cylinder press performs printing at usually 800 to 1500 rotations per hour (number of times printed per 1 hour), so that the squeegee and scraper movement is rapid (about 350 mm per second or faster), and therefore the screen ink used for the cylinder press is an ink for screen printing having a low-viscosity property allowing the ink to follow the high-speed movement of the squeegee and scraper on the screen printing plate and to be evenly and sufficiently present on the plate.

However, when a screen ink simply having such a low-viscosity property is used for printing, it tends to result in spreading and bleeding in printed images due to the low viscosity of the ink, and in printed matter having both a wide-area solid pattern (for example, an approximately 10 cm-square quadrilateral shape) and a fine pattern (for example, an approximately 100 μm-diameter dot pattern or a 100 μm-line width fine line pattern), even if the visibility of the solid pattern is smooth and satisfactory, the spreading or bleeding occurring at the image edge sections makes it difficult to achieve sharpness, and with fine patterns, bleeding or thickening of the image can result, thereby impairing the visibility. Such problems become particularly pronounced especially with increased number of prints such as 10, 20, 30, 50 or 100 sheets.

One method used to solve the problem is to increase the viscosity of the ink, but when a high-viscosity ink that simply has increased viscosity is screen printed with a cylinder press, the rapid squeegee and scraper speed can prevent the ink from being able to be present in a sufficient and evenly spread state over the screen printing plate, resulting in defects such as chipping or poor smoothness in printed images. On the other hand, when screen printing is carried out using such high-viscosity screen ink, not with a cylinder press but with a flat bed screen printer (semi-automatic screen printer), wherein the ordinary printing speed is about 600 rotations per hour (a squeegee speed of about 300 mm/sec), the sharpness of printed images is improved but the printing speed is slow and problems are encountered in terms of short-period productivity.

Under such circumstances, when printed matter having a design comprising both a solid pattern and a fine pattern is created by high-speed screen printing, it is common to carry out the printing in two steps despite the disadvantage of having an increased number of printing steps, the steps being first printing a solid pattern alone by a step of printing the solid pattern with ink adjusted to reduced viscosity of a suitable level allowing printing of attractive solid patterns, followed by printing of a fine pattern by a step of a fine pattern alone with ink adjusted to an increased viscosity of a suitable level such that significant spreading, thickening or bleeding does not occur in the fine pattern, while it has been difficult to create printed matter of consistently stable quality since inks with adjusted viscosity suited for each step are used.

However, even with high-speed screen printing of printed matter having designs that are combinations of solid patterns and fine patterns, there is a strong demand in the market for ink having a flow property that allows printing of printed matter of consistently stable quality in a single step, and the importance of the present invention is that it leads to a solution to this problem.

Prior Patent Document 1 (Japanese Unexamined Patent Application Publication No. 2010-047716) discloses a conductive ink composition and conductive coating film for screen printing that can form high-definition patterns, but it is an ink for printed matter comprising a combination of fine patterns and solid patterns, and moreover it includes no technical disclosure regarding the flow property useful for high-speed screen printing such as with a cylinder press.

Also, Prior Patent Documents 2 (Japanese Unexamined Patent Application Publication No. 2003-238876), Prior Patent Document 3 (Japanese Unexamined Patent Application Publication No. 2003-294930) and Prior Patent Document 4 (Japanese Unexamined Patent Application Publication No. 2012-017411) disclose flow property technology relating to ink compositions for screen printing that allow formation of high-definition patterns, but although the disclosures are of techniques for highly precise screen printing of fine patterns, as with Prior art document PTL 1, there is no technical disclosure or suggestion regarding an ink composition for satisfactory simultaneous printing of fine patterns and solid patterns in a single step using a high-speed screen printer such as a high-speed cylinder press.

Furthermore, Prior Patent Document 5 (Japanese Unexamined Patent Application Publication No. 2010-047649) discloses a composition for conductive screen printing and a technique relating to differences in the amount of change in suitable spread of the composition with respect to time based on a spread meter, but there is no technical disclosure or suggestion regarding any technique relating to high-speed screen printing, or to an ink composition for satisfactory simultaneous printing of fine patterns and solid patterns in a single step by high-speed screen printing.

Furthermore, Prior Patent Document 6 (Japanese Unexamined Patent Application Publication No. 2009-030065) discloses an ink composition for screen printing containing a resin, solvent, etc., and having excellent metallic luster or mirror surface gloss surface, and excellent adhesiveness onto base materials, but there is no technical disclosure or suggestion regarding any technique relating to high-speed screen printing, or to an ink composition for satisfactory simultaneous printing of fine patterns and solid patterns in a single step by high-speed screen printing.

CITATION LIST

Patent Document

[Prior Patent Document 1] Japanese Unexamined Patent Application Publication No. 2010-047716
[Prior Patent Document 2] Japanese Unexamined Patent Application Publication No. 2003-238876
[Prior Patent Document 3] Japanese Unexamined Patent Application Publication No. 2003-294930
[Prior Patent Document 4] Japanese Unexamined Patent Application Publication No. 2012-017411
[Prior Patent Document 5] Japanese Unexamined Patent Application Publication No. 2010-047649
[Prior Patent Document 6] Japanese Unexamined Patent Application Publication No. 2009-030065

SUMMARY OF THE INVENTION

Problems to be Solved by the Invention

The present invention has been achieved with consideration of the technical background with problems described above, and it relates to an ink composition for high quality/high definition, high-speed screen printing that allows printing of both fine patterns such as fine dot patterns or fine line patterns, and wide-area solid patterns, simultaneously in a single step by high-speed screen printing, which has hitherto been considered impossible to achieve by high-speed screen printing using a cylinder press and semi-automatic screen printer or the like with a squeegee speed of about not less than 350 mm/sec, as well as to printed matter produced by the high-speed screen printing ink composition and to a method for producing the printed matter.

Means for Solving the Problems

The invention relates to an ink composition for high-speed screen printing, which is an ink composition for high quality/high definition high-speed screen printing that, when producing printed matter by high-speed screen printing onto an object to be printed using a screen printing plate made by flat working a photosensitive emulsion film on a 355 mesh/inch polyester mesh printing plate, at a squeegee speed of 400 mm/sec, produces printed matter with a printed image edge spreading width of no more than 10 μm from the printed image design dimensions of the printing plate, the ink composition for high-speed screen printing containing a solvent with a boiling point of not less than 170° C. at not less than 70 wt % of the total solvent, and a prepolymer or polymer with a weight-average molecular weight of not less than 2000 at not less than 7 wt % with respect to the total ink composition, and having a viscosity of not less than 6 Pa·s and less than 30 Pa·s as measured with a BH-type rotating viscosimeter at 25° C., and a thixotropic index (TI Value) of 2.0 to 8.0, the measured flow radius value of 14.0 to 24.0 mm after 1 minute from the start of measurement by a flow property measuring method using a spread meter at 25° C. according to JIS K5701-1:2000.

High-speed screen printing according to the invention is screen printing where printing is carried out with a squeegee speed of about not less than 350 mm/sec, and a typical example is high-speed screen printing with a cylinder press, where screen printing is carried out with a printing speed of 800 to 1500 rotations per hour.

Effect of the Invention

With the ink composition for high-speed screen printing of the invention, it has become possible to print fine patterns and large-area solid patterns with high-quality and high-definition by a single high-speed screen printing step, by using high-speed screen printing with a cylinder press or with a squeegee speed of about not less than 350 mm/sec.

BEST MODE FOR CARRYING OUT THE INVENTION

As mentioned above, the invention relates to an ink composition for high-speed screen printing, which is an ink composition for high quality/high definition high-speed screen printing that, when producing printed matter by high-speed screen printing onto an object to be printed using a screen printing plate made by flat working a photosensitive emulsion film on a 355 mesh/inch polyester mesh printing plate, at a squeegee speed of 400 mm/sec, produces printed matter with a printed image edge spreading width of no more than 10 μm from the printed image design dimensions of the printing plate, the ink composition for high-speed screen printing containing a solvent with a boiling point of not less than 170° C. at not less than 70 wt % of the total solvent, and a prepolymer or polymer with a weight-average molecular weight of not less than 2000 at not less than 7 wt % with respect to the total ink composition, and having a viscosity of not less than 6 Pa·s and less than 30 Pa·s as measured with a BH-type rotating viscosimeter at 25° C., and a thixotropic index (TI Value) of 2.0 to 8.0, the measured flow radius value of 14.0 to 24.0 mm after 1 minute from the start of measurement by a flow property measuring method using a spread meter at 25° C. according to JIS K5701-1:2000.

It further relates to an ink composition for high-speed screen printing, wherein the ink composition satisfies "F60"−"F45"≤0.8 mm, where "F60" is defined as the measured flow radius value after 1 minute and "F45" is defined as the measured flow radius value after 45 seconds from the start of measurement by the flow property measuring method using the spread meter.

It still further relates to an ink composition for high-speed screen printing wherein the solvent with a boiling point of not less than 170° C. is either a DBE (dibasic acid ester) or isophorone, or a combination thereof.

It still further relates to an ink composition for high-speed screen printing wherein the prepolymer or polymer with a weight-average molecular weight of not less than 2000 is an acrylic resin, a copolymer resin of vinyl chloride and vinyl acetate, a polyester resin or an epoxy resin, or a combination thereof.

The invention still further relates to an ink composition for high-speed screen printing, wherein the ink composition contains at least one coloring material, extender pigment and filler, either of one type or multiple types, or a combination thereof, the coloring material, extender pigment and filler are dispersed in the ink composition with a mean particle size of no greater than 35 µm.

The present invention is an ink composition for high-speed screen printing wherein the ink composition is to be printed on a sheet-like or film-like base material selected from among art paper, coated paper, synthetic paper, polyester resin, polycarbonate resin, acrylic resin, polypropylene resin, polyethylene resin, vinyl chloride resin and glass, as the base material object to be printed.

The invention still further relates to printed matter produced by the high-speed screen printing onto an object to be printed using the ink composition for high-speed screen printing.

The invention still further relates to a method for producing printed matter, wherein printed matter is produced by the high-speed screen printing ink composition for high-speed screen printing onto an object to be printed.

The ink composition for high-speed screen printing of the invention contains a solvent with a boiling point of not less than 170° C., at not less than 70 wt % of the total solvent. If the solvent with a boiling point of not less than 170° C. is present in an amount of less than 70% of the total solvent, rapid ink drying on the screen printing plate will cause clogging due to an ink-dried coating on the screen printing plate, and defects will be produced in the fine pattern or at the solid image edge sections, making it impossible to obtain a high-definition printed matter with high quality.

There are no particular restrictions on solvents other than the solvent with a boiling point of not less than 170° C. to be present in the ink composition for high-speed screen printing of the invention, but in order to attenuate the evaporation rate of the solvent with a boiling point of not less than 170° C., by azeotropic evaporation, and obtain more satisfactory stability of the high-speed screen printing ink composition on the screen plate, it is preferred to use solvents whose boiling points are not below 100° C.

The solvent with a boiling point of not less than 170° C. according to the invention may be an organic solvent such as isophorone, a dibasic acid ester (DBE), 3-methoxy-3-methylbutanol, 3-methoxy-3-methylbutyl acetate, ethyleneglycol monobutyl ether acetate, coal tar naphtha with a boiling point of not less than 170° C., diethyleneglycol monoethyl ether (acetate), diethyleneglycol monobutyl ether (acetate) or triethyleneglycol monobutyl ether (acetate), and/or a (meth)acrylate monomer such as 1,6-hexanediol di(meth)acrylate or dipentaerythritol hexa(meth)acrylate, a vinyl ether monomer or amide monomer that hardens under activating energy rays.

Among solvents having boiling points of not less than 170° C., it is more preferred to use either isophorone or a dibasic acid ester (DBE), or a combination thereof, which has high dissolving power for various polymers or prepolymers.

Preferred examples of solvents whose boiling point is not below 100° C., according to the invention, include xylene, cyclohexanone, coal tar naphtha with a boiling point of 160 to 170° C., mineral spirits with a boiling point of 150 to 170° C., 1-methoxy-2-propanol, 1-methoxypropyl-2-acetate and diacetone alcohol.

The solvent of the invention needs only contain not less than 70 wt % of a solvent with a boiling point of not less than 170° C. among the total solvent, but in order to further stabilize the screen printing properties for fine patterns, the boiling point of the solvent is preferably not less than 190° C., and more preferably there is used isophorone or a dibasic acid ester (DBE), or a combination thereof, which has dissolving power for different polymers or prepolymers. However, since using mineral oil or vegetable oil with a boiling point exceeding 250° C. as the solvent results in a poor drying property of the printed coating film, when a solvent having a boiling point of higher than 250° C. is used, it is preferably used at no more than 25 wt % of the total solvent amount.

In addition, the ink composition for high-speed screen printing of the invention contains at least a prepolymer or polymer with a weight-average molecular weight of not less than 2000, as a binder resin, at not less than 7 wt % with respect to the total ink composition.

If the weight-average molecular weight of the prepolymer or polymer is less than 2000, problems such as weak adhesion or durability of the printed coating film onto objects to be printed will result, while if the weight-average molecular weight exceeds 200000, the solubility in solvents will be poor and a greater amount of time and labor will be necessary for production of the ink composition. Therefore, a more preferred weight-average molecular weight range is about 4000 to 100000.

If the content of the prepolymer or polymer with a weight-average molecular weight of not less than 2000 is less than 7 wt % with respect to the total ink composition, this may lead to reduced adhesion and durability of the printed coating film onto objects to be printed, and undesirable results such as leveling defects and pinhole generation in the printed coating film, due to poor dispersion of the coloring agent. If it exceeds 70 wt %, on the other hand, the viscosity may become too high making it difficult to accomplish uniform high-speed screen printing, or the mixing ratio of the solvent with a boiling point of not less than 170° C. will be lower, tending to result in easier drying of the ink on the screen printing plate and tending to result in clogging of fine patterns. Therefore, a more preferred content is about 7 to 70 wt % of the total ink composition, an even more preferred range being 10 to 65 wt % and the most preferred range being 15 to 60 wt %.

The prepolymer or polymer of the invention has a weight-average molecular weight of not less than 2000, and there are no particular restrictions on the type or mixing ratio as long as the content is not less than 7 wt % with respect to the total ink composition and up to a content that allows dissolution in the solvent in the ink composition, although it is desirable to avoid highly hazardous harmful substances, such as substances that are strongly toxic for humans or organisms or substances that create a high environmental load.

Examples for the prepolymer include urethane acrylates, polyester acrylates and epoxy acrylates that harden by activating energy rays, such polymers including polyester resins, various types of modified polyester resins such as urethane-modified polyester resins, epoxy-modified polyester resins and acryl-modified polyester resins, vinyl chloride-vinyl acetate copolymer resins, butyral resins, polyether-urethane resins, polyester-urethane resins, polycarbonate-urethane resins, epoxy resins, phenol resins, acrylic resins, polyamide resins, polyamideimide resins, polyolefin resins, chlorinated polyolefin resins, chlorinated rubber, melamine resins, urea resins, modified cellulose resins such as ethyl cellulose resin, nitrocellulose resins, cellulose acetate butyrate (CAB) and cellulose acetate propionate (CAP), rosin resins, maleic acid resins, natural resins and alkyd resins, any of which may be used alone or in combination.

As the above-mentioned prepolymer or polymer with a weight-average molecular weight of not less than 2000, there are particularly preferred acrylic resins, copolymer resins of vinyl chloride and vinyl acetate or polyester resins, either alone or in combinations, as they have satisfactory adhesion for a wide range of types of objects to be printed and easily form coating films with suitable flexibility.

Furthermore, the ink composition for high-speed screen printing to be applied in a cylinder press according to the invention has a viscosity of not less than 6 Pa·s and less than 30 Pa·s, and more preferably 8 to 26 Pa·s as measured at 20 rpm by a BH-type rotating viscosimeter at 25° C. If the viscosity is less than 6 Pa·s, bleeding and spreading may occur in fine patterns or solid image edge sections making it impossible to obtain a high-quality, high-definition printed image, while if the viscosity is not less than 30 Pa·s, high-speed printing with a cylinder press or the like will not be impossible, but unless the pressure, angle, hardness and edge sharpness of the squeegee, and the pressure of the scraper are carefully adjusted, the ink may not be uniform on the screen printing plate during high-speed printing, or parting of the ink from the printed image pattern of the screen printing plate may be poor during high-speed printing, producing abnormal state in solid images or creating defects in fine patterns or image edge sections.

The viscosity value measured by a BH-type rotating viscosimeter according to the invention is the measured value at 1 minute after the start of measurement at a rotor rotational speed of 20 rpm, with a No. 5 or No. 6 rotor for a viscosity range of 6 to 10 Pa·s, with a No. 6 or No. 7 rotor for a viscosity range of 10 to 50 Pa·s and with a No. 7 rotor for a viscosity range of not less than 50 Pa·s.

Also, the ink composition for high-speed screen printing to be applied in a cylinder press according to the invention has a thixotropic index (TI value) of 2.0 to 8.0, the TI value being more preferably 3.0 to 7.5. If the TI value is less than 2.0, the ink flow property will increase, resulting in spreading in printed images with the passage of time after printing even if the viscosity is near the upper limit of the specified range, such that fine patterns or image edge sections may become enlarged. If the TI value exceeds 8.0, the degree of protrusion of the ink from the screen printing plate will be excessive even if the viscosity is near the lower limit of the specified range, such that bleeding may occur in fine patterns and at image edge sections making it impossible to obtain sharp printed images, or the flow property with time may be impaired, resulting in poor leveling especially on solid images.

The "TI value," for the purpose of the invention, is the ratio of the viscosity value with 2 rpm and the viscosity value with 20 rpm of the BH-type rotating viscosimeter at 25° C., or in other words the value: [viscosity with 2 rotations of BH-type rotating viscosimeter/viscosity with 20 rotations of BH-type rotating viscosimeter].

Furthermore, according to the invention, preferably the ink composition has a measured flow radius value (hereinafter referred to as "flow value") of 14.0 to 24.0 mm after 1 minute from the start of measurement by a flow property measuring method using a spread meter at 25° C. according to JIS K5701-1:2000. It is more preferably 15.0 to 22.0 mm. If the flow value is less than 14.0 mm, the ink will protrude from the screen printing plate during high-speed printing using a cylinder press with greater difficulty, requiring modifications such as increased printing pressure of the squeegee during high-speed screen printing, while if the flow value is greater than 24.0 mm, the degree of ink protrusion from the screen printing plate will tend to be greater, requiring modifications such as lowering the printing pressure of the squeegee during high-speed screen printing.

Moreover, the flow value represents the radius value of ink that has flowed after 1 minute from the start of measurement with a spread meter as mentioned above (hereinafter defined as "F60"), but more preferably, if the radius value after 45 seconds from the start of measurement with a spread meter is defined as "F45," then the ink composition is within the above-mentioned flow value range and "F60"−"F45"≤0.8 mm, to obtain more preferably stable high-quality, high-definition printed images in high-speed printing using cylinder presses. It is more preferably "F60"−"F45"≤0.5 mm. This is so that the ink will have a suitable flow property during printing, and so that after printing, the flow property will be such as to minimize large spread of spreading with the passage of time.

Most specifically, the present inventors found that if "F60"−"F45"≤0.8 mm, with the conditions for the flow value described above satisfied, it is possible to obtain more satisfactorily stable high-quality, high-definition printed images.

The above-mentioned prior art document ([Prior Patent Document 5] Japanese Unexamined Patent Application Publication No. 2010-047649) mentions only the difference in flow value at 10 seconds and 90 seconds with a spread meter, but does not disclose the appropriate range for the flow value.

According to the invention, the present inventors found that when the flow value is less than the lower limit of 14.0 mm as specified by the invention, even if "F60"−"F45"≤0.8 mm is satisfied, the flow property of the ink composition tends to be insufficient resulting in visible jaggedness at the printed image edge sections, and when the flow value is greater than the upper limit of 24.0 mm as specified by the invention, even if "F60"−"F45"≤0.8 mm is satisfied, the flow property of the ink composition tends to increase, resulting in a greater spreading width of the printed image edge sections.

In other words, the present inventors confirmed that, for creation of printed matter comprising a combination of solid patterns and fine patterns, it is possible to obtain more satisfactory high-quality, high-definition quality by screen printing in a single step with a combination wherein "F60"−"F45"≤0.8 mm is specified, while also specifying a suitable value of 14.0 to 24.0 mm for the flow value.

The ink composition of the invention is an ink composition for high-quality/high-definition high-speed screen printing that at least, when printed matter is created by high-speed screen printing onto an object to be printed using a screen printing plate made by flat working on a photosensitive emulsion film with a 355 mesh/inch polyester mesh printing plate, at a squeegee speed of 400 mm/sec, can produce printed matter with a printed image edge spreading width of no more than 10 µm from the printed image design dimensions of the printing plate. If the printed image edge spreading width exceeds 10 µm, enlarged sections of the printed image with respect to the printing plate image design will be visibly apparent and the printed image will become visibly blurred, so that it may no longer be considered high-quality, high-definition decorative printing.

As is mentioned above, the ink composition for high-quality/high-definition high-speed screen printing can be prepared by containing at least a solvent with a boiling point of not less than 170° C. at not less than 70 wt % of the total solvent, containing at least a prepolymer or polymer with a weight-average molecular weight of not less than 2000 at not less than 7 wt % with respect to the total ink composition, and having at least a viscosity of not less than 6 Pa·s and less than 30 Pa·s as measured with a BH-type rotating viscosimeter at 25° C. and at least a thixotropic index of 2.0 to 8.0, and having a measured flow radius value of 14.0 to 24.0 mm for the ink composition after 1 minute from the start of measurement as measured by a flow property measuring method with a spread meter at 25° C. according to JIS K5701-1:2000.

In addition, if the ink composition for high-quality/high-definition high-speed screen printing satisfies the "preferred conditions and/or desirable conditions" mentioned above and/or below, its production of high-speed screen printed matter using a cylinder press or the like will be further facilitated and the high quality/high-definition quality as printed matter may be improved.

Here, when the term "zero" μm is used for the printed image edge spreading width, it means complete absence of spreading of the printed ink and printing as prescribed by the image design on the printing plate, but since the printing plate exists in a state with a knitted screen mesh, even in cases where no spreading of the ink is present after printing there can be an effect of the presence of the screen mesh, tending to create minute chipping or jaggedness at the printed image edge sections. Therefore, the spreading width for decorative printing images is preferably 2 to 10 μm and more preferably 3 to 8 μm.

It is an essential condition for the ink composition for high-speed screen printing of the invention that, at least for printed matter created by high-speed screen printing of an object to be printed using a screen printing plate made by flat working on a photosensitive emulsion film with a 355 mesh/inch polyester mesh printing plate, at a squeegee speed of 400 mm/sec, it can produce printed matter having a printed image edge spreading width of no more than 10 μm from the printed image design dimensions of the printing plate, and therefore even when printed using a screen printing plate made of another type of screen mesh or using a printing plate made of a calendered screen mesh, if the ink composition for high-speed screen printing conforms to the necessary conditions of the invention, the ink composition for high-speed screen printing is within the technical scope of the invention.

Flat working is treatment that further improves the smoothness of the photosensitive emulsion film, while calendering is treatment that further improves the smoothness of the surface of the screen mesh woven for plate making, and both flat working and calendering treatment are common terms in the printing plate industry and screen printing industry.

Naturally, when using a screen printing plate made of a polyester mesh that exceeds 355 mesh (for example, 420 mesh, 508 mesh or the like), or a corresponding stainless steel mesh, spreading of the printed image edges will be even further reduced and the printed image edge sections will be sharper.

On the other hand, when the ink composition for high-speed screen printing of the invention contains at least one coloring material, extender pigment or filler, either of one type or multiple types, or a combination thereof, the coloring material, extender pigment and filler is preferably dispersed in the ink composition with a mean particle size of no greater than 35 μm. When a coloring material, extender pigment or filler with a mean particle size exceeding 35 μm after dispersion is present, clogging of the mesh spacings of the 355 mesh screen printing plate may occur, potentially creating chipping and pinholes in the printed image.

There are no particular restrictions on the method for dispersing the coloring material, extender pigment and filler in the ink composition for high-speed screen printing of the invention, and examples include dispersion using a blade-stirred disperser, bead disperser or triple roll disperser.

The coloring agent, extender pigment and filler are not particularly restricted, and examples of coloring agents include azo pigments, disazo pigments, bisazo pigments, phthalocyanine pigments, anthraquinone-based pigments, isoindoline pigments, dioxazine pigments, quinacridone pigments, perylene-based pigments, carbon black pigments, lake black pigments, perylene black pigments, aniline black pigments, iron oxide pigments, titanium pigments, zinc sulfide pigments and various chromatic color dyes, any one of which, or two or more of which may be used, such coloring materials being preferably used in a mixing ratio of no greater than 60 wt % with respect to the ink composition. The amount is preferably no greater than 50 wt %.

Examples of extender pigments include (fine particulate) silica, talc, calcium carbonate, magnesium carbonate, bentonite, sedimentary barium sulfate, zinc oxide and alumina, any one of which or two or more in combination may be used, such extender pigments being preferably used in a mixing ratio of no greater than 30 wt % with respect to the ink composition.

Examples of fillers include resin beads, metallic particles, metal powder, metal oxide powder, graphite, pearl pigment, fluorescent pigments, wax particles and protein powder. Also included are functional materials, such as ultraviolet absorbing materials, antimicrobial materials, heat absorbing materials, refractive index-modifying materials, slidability-imparting materials, slidability-preventing materials, phosphorescencent materials, polarizing materials, anti-reflection materials and diffusible materials. These may be used alone or in combinations of multiple types, and such fillers are preferably used in a mixing ratio of no greater than 70 wt %, more preferably no greater than 50 wt % and even more preferably no greater than 30 wt %, with respect to the ink composition.

Furthermore, an ink composition for high-speed screen printing of the invention containing the above-mentioned coloring agents, extender pigments and fillers is not limited to such graphic decorative screen printed matter, and can be used to produce high-definition screen printed matter even when used for printing onto electric and electronic parts, such as black matrix or stripe printing for increased display visibility, pattern printing for function as a resist, spacer printing to avoid contact between members, or dot printing designed for specific area sizes, to ensure uniformity of luminance in light guiding panels using a cylinder press.

Generally speaking, black inks with a high masking property are usually used for black matrix or stripe printing, white inks, black inks, chromatic color inks, transparent inks, dispersive inks and/or the mixed inks are usually used for resist printing or spacer printing, and inks containing fillers with light diffusing functions such as silica or various types of beads, are usually used for light guiding panel dot printing.

A filler in the ink composition of the invention may be a filler with a conductive property. Such conductive fillers include gold powder, silver powder, copper powder, iron powder, indium powder and tungsten powder, and/or their oxides or complexes, as well as graphite, carbon black and the like. In addition, for a printing ink composition containing such a conductive filler, the type and content of the conductive filler may be selected to obtain electrical resistance values in accordance with the purpose of the printed coating film, and for example, volume resistance values range of no greater than $10^{-2}$ Ω/cm, $10^{-2}$ Ω/cm to 10 Ω/cm or 10 Ω/cm to $10^6$ Ω/cm may be selected as appropriate. The conductive fillers may be used alone, or several different types may be used in combination.

The conductive filler is preferably present in a dispersed state with a mean particle size of no greater than 10 μm in the ink composition, in order to ensure a stabilized resistance value for the printed matter. The content is preferably an amount appropriate for the desired performance, in a content range of no greater than 70 wt % in the ink composition, in order to obtain an electrical resistance value suited for the purpose.

In a conductive ink composition for the high-speed screen printing using a conductive filler, it is preferred to use a polyester resin, acrylic resin, epoxy resin, nitrocellulose resin, ethyl cellulose resin, rosin-modified maleic acid resin, urethane acrylate prepolymer, polyester acrylate prepolymer, epoxy acrylate prepolymer or the like having a weight-average molecular weight of about 3000 to 30000, or a resin or prepolymer comprising a combination thereof, as a binder resin, at about 7 to 40 wt % with respect to the total of the conductive ink composition for high-speed screen printing. Furthermore, the solvent used may be the above-mentioned solvent with a boiling point of not less than 170° C. in an amount of not less than 70 wt % of the total solvent, while as is mentioned above, the conductive filler is preferably used in an amount of no greater than 70 wt % with respect to the total conductive ink composition for high-speed screen printing, depending on the desired conductive performance, and if necessary, additives such as antifoaming agents, leveling agents and dispersing agents may be added.

Moreover, in a coating film formed using the conductive ink composition for the high-speed screen printing, when a volume resistance value of lower than about $10^{-2}$ Ω/cm is the target it is preferred to use gold powder, silver powder, copper powder, iron powder, indium powder or tungsten powder, and/or their oxides or complexes in the conductive filler, when a volume resistance value of about $10^{-2}$ Ω/cm to 10 Ω/cm is the target it is preferred to use graphite, carbon black or their combination in the conductive filler, and when a volume resistance value of greater than 10 Ω/cm is the target it is preferred to mainly use carbon black in the conductive filler.

Furthermore, the invention also provides printed matter produced by the high-speed screen printing ink composition for high-speed screen printing onto an object to be printed.

The invention still further provides a method for producing printed matter, wherein printed matter is produced by the high-speed screen printing ink composition for high-speed screen printing onto an object to be printed.

In the printed matter and method for producing printed matter provided by the invention, the object to be printed that is used may be art paper, coated paper, various types of synthetic paper, polyester (PET), polycarbonate (PC), acryl, polypropylene (PP), polyethylene (PE), vinyl chloride, glass or the like, which may be in the form of various flat base materials, sheet-like base materials or film-like base materials.

Especially, by using an ink composition for the high-speed screen printing of the invention, a notable effect is obtained allowing creation of high-quality, high-definition printed matter in a single printing step, for examples among these, creation of display-related printed matter that comprises a combination of solid patterns and fine patterns such as black matrices, on panel frame sections and the like, employing glass base materials and PET base materials, printed advertisements that comprise a combination of solid patterns such as marks and logos employing sheet base materials and PP base materials, and fine patterns such as color separated halftone dots, and printed matter for household appliance name plates that comprise a combination of solid patterns on display screens employing PC base materials, acrylic base materials or PET base materials, and fine patterns such as hairline decorations.

EXAMPLES

Examples and Comparative Examples of the invention are shown in [Table 1] below. However, the invention is not limited to these examples.

TABLE 1

| | Example 1 | Example 2 | Example 3 | Example 4 | Example 5 | Example 6 | Example 7 |
|---|---|---|---|---|---|---|---|
| <Ink composition components> | | | | | | | |
| Polyester resin (molecular weight: 6000) | 19.0 | | | | 28.0 | 5.0 | |
| Polyester resin (molecular weight: 28000) | 19.0 | | 25.0 | | | | |
| Acrylic resin (molecular weight: 100000) | | 5.0 | | | | | |
| Vinyl chloride-vinyl acetate copolymer resin (molecular weight: 47000) | | 8.0 | | | | 5.0 | |
| Epoxy resin (molecular weight: 60000) | | | | 50.0 | 10.0 | | |
| Urethane acrylate (molecular weight: 2000) | | | | | | | 40.0 |
| Isophorone (boiling point: 216° C.) | | 45.0 | 12.0 | 10.0 | | 14.0 | |
| DBE (boiling point: 203-245° C.) | 38.5 | | 12.0 | | | 14.0 | |
| 3-Methoxy-3-methyl butanol (boiling point: 174° C.) | | | | 10.0 | 20.0 | | |
| Coal tar naphtha (boiling point: 180-200° C.) | | | 5.0 | | 10.0 | | |
| 1,6-Hexanediol diacrylate (boiling point: 200° C.) | | | | | | | 30.0 |
| Dipentaerythritol hexaacrylate (boiling point: 200° C.) | | | | | | | 10.0 |
| 1-Methoxypropyl-2-acetate (boiling point: 146° C.) | 16.5 | | | | 10.0 | | |
| 1-Methoxy-2-propanol (boiling point: 120° C.) | | | 6.0 | 8.0 | | | |
| Cyclohexanone (boiling point: 156° C.) | | 10.0 | | | | 12.0 | |

TABLE 1-continued

|  | Example 1 | Example 2 | Example 3 | Example 4 | Example 5 | Example 6 | Example 7 |
|---|---|---|---|---|---|---|---|
| Diacetone alcohol (boiling point: 168° C.) |  | 5.0 |  |  |  |  |  |
| Carbon black pigment |  |  |  | 14.0 |  | 5.0 |  |
| Phthalocyanine green pigment |  |  |  |  | 8.0 |  |  |
| Isoindoline yellow pigment |  |  | 20.0 |  |  |  |  |
| Titanium oxide white pigment |  | 10.0 |  |  | 2.0 | 20.0 |  |
| Conductive carbon black pigment |  |  |  |  |  |  |  |
| Graphite |  |  |  |  |  |  |  |
| Copper powder |  |  |  |  |  |  |  |
| Photoinitiator |  |  |  |  |  |  | 5.0 |
| Antifoaming agent, additives, etc. | 5.0 | 5.0 | 5.0 | 5.0 | 5.0 | 5.0 | 5.0 |
| Silica | 2.0 | 10.0 | 5.0 | 3.0 | 7.0 | 10.0 | 5.0 |
| Talc |  | 2.0 | 10.0 |  |  | 10.0 | 5.0 |
| <Total component weight ratio> | 100.0 | 100.0 | 100.0 | 100.0 | 100.0 | 100.0 | 100.0 |
| <Object printed> | Polyester film | Polyester film | Polycarbonate sheet | Glass | Acrylic board | Vinyl chloride film | Coated sheet |
| <Physical property values> |  |  |  |  |  |  |  |
| Viscosity [Pa · s] | 9.0 | 6.0 | 29.0 | 10.0 | 15.0 | 8.0 | 6.0 |
| TI value [—] | 3.0 | 8.0 | 3.0 | 6.0 | 5.0 | 4.0 | 2.0 |
| Flow value [mm] | 18.0 | 20.0 | 14.0 | 17.0 | 18.0 | 22.0 | 24.0 |
| F60-F45 [mm] | 0.8 | 0.3 | 0.4 | 0.3 | 0.6 | 0.2 | 0.7 |
| Mean particle size of particles in ink [μm] | 0.1 | 25.0 | 15.0 | 20.0 | 30.0 | 25.0 | 35.0 |
| Image edge spreading width [μm] | 8.0 | 3.0 | 5.0 | 7.0 | 6.0 | 8.0 | 10.0 |
| <Printed image evaluation> |  |  |  |  |  |  |  |
| Evaluation of high-quality, high-definition property of 100 μmφ dot-printed image | G | VG | VG | G | G | G | G |
| Evaluation of high-quality, high-definition property of 100 μm lateral fine line-printed image | G | VG | VG | VG | VG | VG | G |
| Evaluation of high-quality, high-definition property of 100 mm side-square solid image | VG | G | G | VG | G | G | G |

|  | Example 8 | Example 9 | Comp. Ex. 1 | Comp. Ex 2 | Comp. Ex. 3 | Comp. Ex. 4 | Comp. Ex. 5 | Comp. Ex. 6 |
|---|---|---|---|---|---|---|---|---|
| <Ink composition components> |  |  |  |  |  |  |  |  |
| Polyester resin (molecular weight: 6000) |  | 7.0 | 15.0 |  |  |  |  |  |
| Polyester resin (molecular weight: 28000) | 10.0 |  | 15.0 |  | 5.0 |  | 30.0 | 7.0 |
| Acrylic resin (molecular weight: 100000) |  |  |  | 25.0 | 10.0 |  |  |  |
| Vinyl chloride-vinyl acetate copolymer resin (molecular weight: 47000) |  |  |  |  |  |  |  |  |
| Epoxy resin (molecular weight: 60000) |  |  |  | 25.0 |  |  |  |  |
| Urethane acrylate (molecular weight: 2000) |  |  |  |  |  | 20.0 |  |  |
| Isophorone (boiling point: 216° C.) | 14.0 | 10.0 | 15.0 | 15.0 | 30.0 |  | 10.0 | 15.0 |
| DBE (boiling point: 203-245° C.) | 14.0 | 10.0 | 20.0 |  | 20.0 |  | 10.0 | 15.0 |
| 3-Methoxy-3-methyl butanol (boiling point: 174° C.) |  | 5.0 |  |  |  |  |  |  |
| Coal tar naphtha (boiling point: 180-200° C.) | 7.0 |  |  |  | 10.0 |  | 4.0 | 7.0 |
| 1,6-Hexanediol diacrylate (boiling point: 200° C.) |  |  |  |  |  | 50.0 |  |  |
| Dipentaerythritol hexaacrylate (boiling point: 200° C.) |  |  |  |  |  | 20.0 |  |  |
| 1-Methoxypropyl-2-acetate (boiling point: 146° C.) |  |  |  |  |  |  |  |  |
| 1-Methoxy-2-propanol (boiling point: 120° C.) | 10.0 | 3.0 |  |  | 9.0 |  | 6.0 | 9.0 |
| Cyclohexanone (boiling point: 156° C.) |  |  | 20.0 |  |  |  |  |  |
| Diacetone alcohol (boiling point: 168° C.) |  |  |  |  |  |  |  |  |
| Carbon black pigment |  |  | 10.0 | 9.0 | 5.0 |  |  |  |
| Phthalocyanine green pigment |  |  |  | 9.0 | 5.0 |  |  |  |
| Isoindoline yellow pigment |  |  |  |  |  |  | 20.0 |  |
| Titanium oxide white pigment |  |  |  |  |  |  |  |  |
| Conductive carbon black pigment | 15.0 |  |  |  |  |  |  | 15.0 |
| Graphite | 20.0 |  |  |  |  |  |  | 20.0 |
| Copper powder |  | 60.0 |  |  |  |  |  |  |
| Photoinitiator |  |  |  |  |  | 5.0 |  |  |
| Antifoaming agent, additives, etc. | 5.0 | 5.0 | 5.0 | 5.0 | 5.0 | 5.0 | 5.0 | 5.0 |
| Silica | 5.0 |  |  | 5.0 | 1.0 |  | 5.0 | 7.0 |
| Talc |  |  |  |  | 7.0 |  | 10.0 |  |
| <Total component weight ratio> | 100.0 | 100.0 | 100.0 | 100.0 | 100.0 | 100.0 | 100.0 | 100.0 |
| <Object printed> | Acrylic board | Polyester film | Polyester film | Polyester film | Acrylic board | Coated sheet | Polycarbonate sheet | Polyester film |
| <Physical property values> |  |  |  |  |  |  |  |  |
| Viscosity [Pa · s] | 29.0 | 25.0 | 7.0 | 30.0 | 4.0 | 3.0 | 40.0 | 30.0 |
| TI value [—] | 8.0 | 4.0 | 1.3 | 8.0 | 1.2 | 1.1 | 3.0 | 6.0 |
| Flow value [mm] | 14.0 | 20.0 | 16.0 | 13.0 | 29.0 | 32.0 | 18.0 | 20.0 |
| F60-F45 [mm] | 0.2 | 0.7 | 0.8 | 0.1 | 1.5 | 2.0 | 0.5 | 0.2 |

TABLE 1-continued

|  |  |  |  |  |  |  |  |  |
|---|---|---|---|---|---|---|---|---|
| Mean particle size of particles in ink [μm] | 10.0 | 5.0 | 25.0 | 35.0 | 25.0 | 0.0 | 15.0 | 10.0 |
| Image edge spreading width [μm] | 2.0 | 8.0 | 8.0 | 7.0 | 20.0 | 25.0 | 3.0 | 2.0 |
| <Printed image evaluation> |  |  |  |  |  |  |  |  |
| Evaluation of high-quality, high-definition property of 100 μmφ dot-printed image | VG | VG | F | VG | F | P | G | G |
| Evaluation of high-quality, high-definition property of 100 μm lateral fine line-printed image | VG | VG | F | G | F | P | G | G |
| Evaluation of high-quality, high-definition property of 100 mm side-square solid image | VG | G | G | P | G | VG | F | P |

In table 1, VG, G, F, and P mean following state.:
VG: Very Good
G: Good
F: Fair
P: Poor For the ink compositions for high-speed screen printing of the examples and comparative examples, the materials listed in Table 1 were uniformly mixed by stirring using a propeller rotating stirrer, in the mixing ratios (wt %) listed in the same table, and then subjected to 2 passes of a triple roll mill disperser, and each produced ink composition was measured for viscosity, TI value, flow value (F60) and F60–F45 value by the methods described above.

Next, ink compositions for high-speed screen printing of the examples and comparative examples were used for high-speed screen printing with a squeegee speed of 400 mm/sec, onto the objects to be printed listed in Table 1 with a screen printing plate made by flat working of a photosensitive emulsion film on a 355 mesh/inch polyester mesh printing plate. The high-speed screen printing conditions were "a squeegee with 80 degrees of hardness, pressing with a squeegee printing pressure of 1.5 mm, a squeegee angle of 75 degrees and pressing with a scraper pressure of 1.5 mm."

The screen printing plate was one having a printed image design comprising a 100 μmφ dot pattern, a 100 μm longitudinal fine line pattern parallel to the printing direction, a 100 μm lateral fine line pattern that was perpendicular to the printing direction, a crevice pattern with a 150 μm spacing, perpendicular to the printing direction, and a square solid pattern with 100 mm sides.

The width of spreading at the image edges after the ink compositions for high-speed screen printing of the examples and comparative examples were printed was measured by observing the printed coating film image sections printed with the crevice pattern in the screen printing plate, perpendicular to the printing direction and having 150 μm spacings, with a length meter-mounted digital microscope at 200× magnification, measuring the spacings between the printed crevice, and then calculating the difference from the printing plate design spacing of 150 μm. For example, when the spacings between the printed crevice were 140 μm, the difference from the printing plate design spacing of 150 μm was 10 μm, but since the image edges are on both sides of the crevices, the width of spreading at the image edges on one side is 5 μm, and this was therefore recorded as the "image edge spreading width."

Evaluation of the high-quality, high-definition property of the printed images was made as follows based on direct visual and 200× magnified observation with a digital microscope. The evaluation was conducted for 50th printed objects.

Evaluation of [High-quality, high-definition property of 100 μmφ dot-printed image]
VG: Absolutely no defects such as chipping in 100 dot shapes.
G: Fine chipping, bleeding or shape distortion of 1 to 5 dots out of 100.
F: Chipping, bleeding or shape distortion of 6 to 30 dots out of 100.
P: Abnormalities in 31 or more dots out of 100.

Evaluation of [High-quality, high-definition property of 100 μm lateral fine line-printed image]
VG: Absolutely no defects such as spreading, distortion, bleeding or chipping.
G: Approximately 10 μm enlargement or thinning, but no loss due to bleeding or chipping.
F: not less than 11 μm enlargement or thinning.
P: Chipping of fine lines.

Evaluation of [High-quality, high-definition property of 100 mm side-square solid pattern]
VG: Printed image with satisfactory leveling property and smoothness.
G: Slightly inferior leveling property but within allowable range for practical use.
F: Leveling property within allowable range for practical use, but printing abnormalities occurred.
P: Poor leveling property and unsuitable for practical use, with printing abnormalities also present.

When the ink composition of Example 4 was used for black matrix (lattice) printing with a line width of 200 μm using a semi-automatic screen printer, or the ink composition of Example 6 was used for high-speed screen printing of black stripe lines with a 150 μm line width using a cylinder press, high-definition screen printed matter was obtained in both cases with no defects such as bleeding or chipping and a single-side spreading width of 7 to 8 μm on the lines.

Also, when the ink composition of Example 5 was used for resist pattern printing including a 100 μm line width using a cylinder press, high-definition high-speed screen printed matter was obtained with no defects such as bleeding or chipping and a pattern edge spreading width of 6 μm.

When the ink composition of Example 7 was used for spacer pattern printing with an 80 μm angle corner area and a 25 μm film thickness using a cylinder press, high-definition high-speed screen printed matter was obtained with no defects such as bleeding or chipping and a pattern edge spreading width of 10 μm.

When the ink composition of Example 2 was used for printing of a light guiding panel dot group including a 300 μmφ dot pattern, high-definition high-speed screen printed matter was obtained with no defects such as bleeding or chipping and a pattern edge spreading width of 3 μm.

As a result of measuring the volume resistance values of the coating films formed with the ink compositions of Example 8 and Example 9, they were $1.0 \times 10^{-1}$ Ω/cm and $9.0 \times 10^{-1}$ Ω/cm, respectively, confirming that the expected performance as a conductive coating film was successfully obtained.

The invention claimed is:

1. An ink composition for high quality/high definition high-speed screen printing, the ink composition comprising:
   at least one solvent having a boiling point of not less than 170° C. and that is selected from the group consisting of isophorone, a dibasic acid ester (DBE), 3-methoxy-3-methylbutanol, 3-methoxy-3-methylbutyl acetate, ethyleneglycol monobutyl ether acetate, coal tar naphtha, diethyleneglycol monoethyl ether, diethyleneglycol monoethyl ether acetate, diethyleneglycol monobutyl ether, diethyleneglycol monobutyl ether acetate, triethyleneglycol monobutyl ether, triethyleneglycol monobutyl ether acetate, 1,6-hexanediol di(meth)acrylate, dipentaerythritol hexa(meth)acrylate, a vinyl ether monomer, and an amide monomer, wherein the amount of the at least one solvent having a boiling point of not less than 170° C. is not less than 70 wt % of a total weight of all solvent in the ink composition; and
   a prepolymer or polymer with a weight-average molecular weight in the range of 2000 to 100,000, in an amount in the range of 7 wt % to 70 wt % with respect to a total weight of the ink composition, the prepolymer or polymer being selected from the group consisting of polyester resins, vinyl chloride-vinyl acetate copolymer resins, butyral resins, polyether-urethane resins, polyester-urethane resins, polycarbonate-urethane resins, epoxy resins, phenol resins, acrylic resins, polyamide resins, polyamideimide resins, polyolefin resins, chlorinated polyolefin resins, chlorinated rubber, melamine resins, urea resins, modified cellulose resins, rosin resins, maleic acid resins, natural resins, alkyd resins, and combinations thereof,
   wherein:
   the ink composition has:
      a viscosity of not less than 6 Pas and less than 30 Pas as measured with a BH-type rotating viscosimeter at 25° C.,
      a thixotropic index (TI Value) of 2.0 to 8.0, and
      a measured flow radius value of 14.0 to 24.0 mm after 1 minute from a start of measurement by a flow property measuring method using a spread meter at 25° C. according to JIS K5701-1:2000,
   the ink composition satisfies "F60"–"F45"≤0.8 mm, where "F60" is defined as the measured flow radius value after 1 minute and "F45" is defined as the measured flow radius value after 45 seconds from the start of measurement by the flow property measuring method using the spread meter, and
   the ink composition is adapted to produce printed matter in a single step comprising a combination of solid patterns and fine patterns with a printed image edge spreading width of no more than 10 μm from printed image design dimensions of a printing plate, when producing printed matter by screen printing onto an object to be printed using a screen printing plate made by flat working a photosensitive emulsion film on a 355 mesh/inch polyester mesh printing plate, at a squeegee speed of 400 mm/sec, the object to be printed being a flat base material selected from the group consisting of art paper, coated paper, synthetic paper, polyester, polycarbonate, acryl, polypropylene, polyethylene, vinyl chloride, and glass.

2. The ink composition for high-speed screen printing according to claim 1, wherein the prepolymer or polymer is selected from the group consisting of an acrylic resin, a copolymer resin of vinyl chloride and vinyl acetate, a polyester resin, an epoxy resin, and a combination thereof.

3. The ink composition for high-speed screen printing according to claim 1, further comprising at least one of a coloring material, extender pigment and filler, or a combination thereof, that is dispersed in the ink composition with a mean particle size of no greater than 35 μm.

4. The ink composition for high-speed screen printing according to claim 1, wherein the ink composition is to be printed on a sheet-like or film-like base material selected from the group consisting of art paper, coated paper, synthetic paper, polyester resin, polycarbonate resin, acrylic resin, polypropylene resin, polyethylene resin, vinyl chloride resin and glass.

5. A printed matter comprising an ink layer formed of the ink composition for high-speed screen printing according to claim 1.

6. A method for producing printed matter, the method comprising transferring the ink composition for high-speed screen printing according to claim 1 onto a substrate.

7. The ink composition for high-speed screen printing according to claim 1, wherein the ink composition, when producing printed matter by screen printing onto an object to be printed using a screen printing plate made by flat working a photosensitive emulsion film on a 355 mesh/inch polyester mesh printing plate, at a squeegee speed of 400 mm/sec, produces printed matter with a printed image edge spreading width of no more than 10 μm and no less than 2 μm from printed image design dimensions of the printing plate.

8. An ink composition for high quality/high definition high-speed screen printing, the ink composition comprising:
   at least one solvent having a boiling point of not less than 170° C. and that is selected from the group consisting of isophorone, a dibasic acid ester (DBE), 3-methoxy-3-methylbutanol, 3-methoxy-3-methylbutyl acetate, ethyleneglycol monobutyl ether acetate, coal tar naphtha, diethyleneglycol monoethyl ether, diethyleneglycol monoethyl ether acetate, diethyleneglycol monobutyl ether, diethyleneglycol monobutyl ether acetate, triethyleneglycol monobutyl ether, triethyleneglycol monobutyl ether acetate, 1,6-hexanediol di(meth)acrylate, dipentaerythritol hexa(meth)acrylate, a vinyl ether monomer, and an amide monomer, wherein the amount of the at least one solvent having a boiling point of not less than 170° C. is not less than 70 wt % of a total weight of all solvent in the ink composition; and
   a prepolymer or polymer with a weight-average molecular weight in the range of 2000 to 100,000, in an amount in the range of 15 wt % to 70 wt % with respect to a total weight of the ink composition, the prepolymer or polymer being selected from the group consisting of polyester resins, vinyl chloride-vinyl acetate copolymer resins, butyral resins, polyether-urethane resins, polyester-urethane resins, polycarbonate-urethane resins, epoxy resins, phenol resins, acrylic resins, polyamide resins, polyamideimide resins, polyolefin resins, chlorinated polyolefin resins, chlorinated rubber, melamine resins, urea resins, modified cellulose resins, rosin resins, maleic acid resins, natural resins, alkyd resins, and combinations thereof,
   wherein:
   the ink composition has:
      a viscosity of not less than 6 Pa·s and less than 30 Pa·s as measured with a BH-type rotating viscosimeter at 25° C.,
      a thixotropic index (TI Value) of 2.0 to 8.0, and a measured flow radius value of 14.0 to 24.0 mm after 1 minute from a start of measurement by a flow property measuring method using a spread meter at 25° C. according to JIS K5701-1:2000, the ink composition satisfies "F60"−"F45"≤0.8 mm, where "F60" is defined as the measured flow radius value after 1 minute and "F45" is defined as the measured flow radius value after 45 seconds from the start of measurement by the flow property measuring method using the spread meter, and the ink composition is adapted to produce printed matter in a single step comprising a combination of solid patterns and fine patterns with a printed image edge spreading width of no more than 10 μm from printed image design dimensions of a printing plate, when producing printed matter by screen printing onto an object to be printed using a screen printing plate made by flat working a photosensitive emulsion film on a 355 mesh/inch polyester mesh printing plate, at a squeegee speed of 400 mm/sec, the object to be printed being a flat base material selected from the group consisting of art paper, coated paper, synthetic paper, polyester, polycarbonate, acryl, polypropylene, polyethylene, vinyl chloride, and glass.

9. An ink composition for high quality/high definition high-speed screen printing, the ink composition comprising:
at least one solvent having a boiling point of not less than 170° C. and that is selected from the group consisting of isophorone, a dibasic acid ester (DBE), 3-methoxy-3-methylbutanol, 3-methoxy-3-methylbutyl acetate, ethyleneglycol monobutyl ether acetate, coal tar naphtha, diethyleneglycol monoethyl ether, diethyleneglycol monoethyl ether acetate, diethyleneglycol monobutyl ether, diethyleneglycol monobutyl ether acetate, triethyleneglycol monobutyl ether, triethyleneglycol monobutyl ether acetate, 1,6-hexanediol di(meth)acrylate, dipentaerythritol hexa(meth)acrylate, a vinyl ether monomer, and an amide monomer, wherein the amount of the at least one solvent having a boiling point of not less than 170° C. is not less than 70 wt % of a total weight of all solvent in the ink composition;

a prepolymer or polymer with a weight-average molecular weight in the range of 2000 to 100,000, in an amount in the range of 7 wt % to 70 wt % with respect to a total weight of the ink composition, the prepolymer or polymer being selected from the group consisting of polyester resins, vinyl chloride-vinyl acetate copolymer resins, butyral resins, polyether-urethane resins, polyester-urethane resins, polycarbonate-urethane resins, epoxy resins, phenol resins, acrylic resins, polyamide resins, polyamideimide resins, polyolefin resins, chlorinated polyolefin resins, chlorinated rubber, melamine resins, urea resins, modified cellulose resins, rosin resins, maleic acid resins, natural resins, alkyd resins, and combinations thereof; and an extender pigment dispersed in the ink composition with a mean particle size of no greater than 35 μm in an amount in the range of 10 wt % to 30 wt % with respect to the total weight of the ink composition, wherein:
the ink composition has:
a viscosity of not less than 6 Pa·s and less than 30 Pa·s as measured with a BH-type rotating viscosimeter at 25° C.,
a thixotropic index (TI Value) of 2.0 to 8.0, and
a measured flow radius value of 14.0 to 24.0 mm after 1 minute from a start of measurement by a flow property measuring method using a spread meter at 25° C. according to JIS K5701-1:2000, the ink composition satisfies "F60"−"F45"≤0.8 mm, where "F60" is defined as the measured flow radius value after 1 minute and "F45" is defined as the measured flow radius value after 45 seconds from the start of measurement by the flow property measuring method using the spread meter, the ink composition is adapted to produce printed matter in a single step comprising a combination of solid patterns and fine patterns with a printed image edge spreading width of no more than 10 μm from printed image design dimensions of a printing plate, when producing printed matter by screen printing onto an object to be printed using a screen printing plate made by flat working a photosensitive emulsion film on a 355 mesh/inch polyester mesh printing plate, at a squeegee speed of 400 mm/sec, the object to be printed being a flat base material selected from the group consisting of art paper, coated paper, synthetic paper, polyester, polycarbonate, acryl, polypropylene, polyethylene, vinyl chloride, and glass.

10. An ink composition for high quality/high definition high-speed screen printing, the ink composition comprising:
at least one solvent having a boiling point of not less than 170° C. and that is selected from the group consisting of isophorone, a dibasic acid ester (DBE), 3-methoxy-3-methylbutanol, 3-methoxy-3-methylbutyl acetate, ethyleneglycol monobutyl ether acetate, coal tar naphtha, diethyleneglycol monoethyl ether, diethyleneglycol monoethyl ether acetate, diethyleneglycol monobutyl ether, diethyleneglycol monobutyl ether acetate, triethyleneglycol monobutyl ether, triethyleneglycol monobutyl ether acetate, 1,6-hexanediol di(meth)acrylate, dipentaerythritol hexa(meth)acrylate, a vinyl ether monomer, and an amide monomer, wherein the amount of the at least one solvent having a boiling point of not less than 170° C. is not less than 70 wt % of a total weight of all solvent in the ink composition; and a prepolymer or polymer with a weight-average molecular weight in the range of 2000 to 100,000, in an amount in the range of 7 wt % to 70 wt % with respect to a total weight of the ink composition, the prepolymer or polymer being selected from the group consisting of polyester resins, vinyl chloride-vinyl acetate copolymer resins, butyral resins, polyether-urethane resins, polyester-urethane resins, polycarbonate-urethane resins, epoxy resins, phenol resins, acrylic resins, polyamide resins, polyamideimide resins, polyolefin resins, chlorinated polyolefin resins, chlorinated rubber, melamine resins, urea resins, modified cellulose resins, rosin resins, maleic acid resins, natural resins, alkyd resins, and combinations thereof, wherein:
the ink composition has:
a viscosity of not less than 6 Pa·s and less than 30 Pa·s as measured with a BH-type rotating viscosimeter at 25° C.,
a thixotropic index (TI Value) of 2.0 to 8.0, and
a measured flow radius value of 14.0 to 24.0 mm after 1 minute from a start of measurement by a flow property measuring method using a spread meter at 25° C. according to JIS K5701-1:2000, the ink composition satisfies "F60"−"F45"≤0.8 mm, where "F60" is defined as the measured flow radius value after 1 minute and "F45" is defined as the measured flow radius value after 45 seconds from the start of measurement by the flow property measuring method using the spread meter, the ink composition is adapted to produce printed matter in a single step comprising a combination of solid patterns and fine patterns with a printed image edge spreading width of no more than 10 μm from printed image design dimensions of a printing plate, when producing printed matter by screen printing onto an object to be printed using a screen printing plate made by flat working a photosensitive emulsion film on a 355 mesh/inch polyester mesh printing plate, at a squeegee speed of 400 mm/sec, the object to be printed being a flat base material selected from the group consisting of art paper, coated paper, synthetic paper, polyester, polycarbonate, acryl, polypropylene, polyethylene, vinyl chloride, and glass, and the ink composition does not comprise a filler having a conductive property.

* * * * *